United States Patent
Hartl et al.

(10) Patent No.: US 10,366,256 B2
(45) Date of Patent: Jul. 30, 2019

(54) METALLURGICAL VESSEL HAVING A PLURALITY OF TRANSPONDERS

(71) Applicant: Primetals Technologies Austria GmbH, Linz (AT)

(72) Inventors: Franz Hartl, Kallham (AT); Thomas Kuehas, Luftenberg (AT); Andreas Rohrhofer, Linz (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 88 days.

(21) Appl. No.: 15/525,341

(22) PCT Filed: Sep. 10, 2015

(86) PCT No.: PCT/EP2015/070725
§ 371 (c)(1),
(2) Date: May 9, 2017

(87) PCT Pub. No.: WO2016/074824
PCT Pub. Date: May 19, 2016

(65) Prior Publication Data
US 2018/0285603 A1 Oct. 4, 2018

(30) Foreign Application Priority Data
Nov. 11, 2014 (EP) .................................. 14192673

(51) Int. Cl.
*G06K 7/00* (2006.01)
*G06K 19/07* (2006.01)
(Continued)

(52) U.S. Cl.
CPC ....... *G06K 7/0008* (2013.01); *G06K 19/0723* (2013.01); *G06K 19/07749* (2013.01)

(58) Field of Classification Search
CPC .. H05K 7/20; H05K 5/02; H05K 5/00; H05K 7/00; H02K 7/18; H01L 41/053;
(Continued)

(56) References Cited

U.S. PATENT DOCUMENTS 7,044,388 B2 * 5/2006 Kamiya ............... G06K 19/072
235/441
8,136,735 B2 * 3/2012 Arai .................. G06K 19/07718
235/492

(Continued)

FOREIGN PATENT DOCUMENTS

DE 10 2008 011 288 A1 9/2009
EP 2 119 989 A2 11/2009
(Continued)

OTHER PUBLICATIONS

Japanese Office Action, dated May 21, 2018, issued in corresponding Japanese Patent Application No. 2017-543876. English translation. Total 7 pages.
(Continued)

*Primary Examiner* — Nam V Nguyen
(74) *Attorney, Agent, or Firm* — Ostrolenk Faber LLP

(57) ABSTRACT

A metallurgical vessel (2) having an outer surface (2a) and an identification tag (1, 1', 1") on the outer surface (2a). The tag has a carrier matrix (11) formed of an electrically and thermally insulating material. At least two passive transponders (3, 3a, 3b) are embedded in the carrier matrix (11). Within a metallurgical plant, a reading station (4) for tracking the path of the metallurgical vessel (2) is arranged at a tracking position. An antenna (5) of the reading station (4) initiates activation of the passive transponders (3, 3a, 3b), provided that the metallurgical vessel (2) is in a sensing range of the reading station (4). A reading unit (6) of the reading station (4) reads out the activated passive transponders (3, 3a, 3b) and transmits the result to an evaluating unit
(Continued)

(7) of the reading station (4). The evaluating unit (7) determines which and/or how many of the passive transponders (3, 3a, 3b) were actually activated. The evaluating unit (7) thereafter associates a wear state with all the passive transponders (3, 3a, 3b) of the metallurgical vessel (2) as a whole.

4 Claims, 4 Drawing Sheets

(51) Int. Cl.
  *G06K 19/077* (2006.01)
  *H05K 5/00* (2006.01)
  *H05K 7/00* (2006.01)

(58) Field of Classification Search
  CPC .......... G06F 1/16; B22D 41/22; B22D 41/46; C21C 5/46; F27B 14/20; F27D 3/14; F27D 19/00; F27D 21/00
  USPC ................................................ 340/10.1–10.5
  See application file for complete search history.

(56) References Cited

U.S. PATENT DOCUMENTS

| | | | |
|---|---|---|---|
| 8,860,566 B2* | 10/2014 | Elstorpff | F16D 66/021 188/1.11 R |
| 9,085,029 B2* | 7/2015 | Truttmann | B22D 41/22 |
| 9,098,791 B2* | 8/2015 | Choi | G06K 19/07783 |
| 2006/0042734 A1* | 3/2006 | Turner | B60C 11/24 152/154.2 |
| 2011/0140970 A1 | 6/2011 | Fukagawa et al. | 342/458 |
| 2013/0043974 A1 | 2/2013 | Hyde et al. | 340/5.61 |
| 2016/0044826 A1* | 2/2016 | Hartl | F27D 21/00 361/709 |
| 2017/0102184 A1* | 4/2017 | Hartl | B22D 41/12 |

FOREIGN PATENT DOCUMENTS

| JP | 2003-216916 A | 7/2003 |
|---|---|---|
| JP | 2005-157869 A | 6/2005 |
| JP | 2008-129838 A | 6/2008 |

OTHER PUBLICATIONS

International Search Report dated Dec. 11, 2015 in corresponding PCT International Application No. PCT/EP2015/070725.
Written Opinion dated Dec. 11, 2015 in corresponding PCT International Application No. PCT/EP2015/070725.
European Search Report dated Apr. 22, 2015 in corresponding European Patent Application No. 14192673.3.

\* cited by examiner

METALLURGICAL VESSEL HAVING A PLURALITY OF TRANSPONDERS

CROSS-REFERENCE TO RELATED APPLICATIONS

The present application is a 35 U.S.C. §§ 371 national phase conversion of PCT/EP2015/070725, filed Sep. 10, 2015, which claims priority of European Patent Application No. 14192673.3, filed Nov. 11, 2014, the contents of which are incorporated by reference herein. The PCT International Application was published in the German language.

TECHNICAL BACKGROUND

The present invention relates to a metallurgical vessel, which has an outer surface and an identification tag arranged on the outer surface. The identification tag has a carrier matrix in which a passive transponder is arranged. The carrier matrix is made of a material which is electrically and thermally insulating.

The present invention relates in addition to an operating method for a reading station, arranged within a metallurgical plant at a tracking position. The station has the purpose of tracking the path of a metallurgical vessel on which at least one passive transponder is arranged.

An antenna of the reading station initiates activation of the passive transponder if there is a metallurgical vessel of this type within a sensing range of the reading station. A reading unit of the reading station thereupon reads out the activated passive transponders and communicates the result of the reading to an evaluating unit in the reading station.

The present invention relates in addition to a reading station arranged within a metallurgical plant at a tracking position.

The reading station has an antenna for the purpose of initiating the activation of passive transponders arranged on a metallurgical vessel. The reading station has a reading unit for reading out the activated passive transponders on the metallurgical vessel and for communicating the data which is read out to an evaluating unit of the reading station. The reading station has the evaluating unit.

In metallurgical industrial plants, metallurgical vessels transport molten raw iron, molten steel, liquid slags, scrap and the like. For example, in a steel works a plurality of vessels are used in various parts of the plant. Depending on the capacity of the steel works, there can then be 30 or more vessels in use at the same time. These travel over various routes between the different parts of the plant. While this is taking place, a plant operator or crane driver must ensure that a particular vessel is brought to the correct place, and that the vessel is then used or stored in accordance with the requirements.

Both from the point of view of quality (least possible cooling down of the raw iron/steel bath in the vessel) and also on grounds of energy saving, the highest possible hot usage of vessels is aimed at. The vessels in a steel works are, for example, heated before being filled with steel from an electric arc oven. In addition, transportation of particular qualities of steel one after another in the same vessel is avoided, because residual small quantities of melt or metal remaining in a vessel from the previous filling can chemically influence the composition of the molten metal in the subsequent filling. This is the case, for example with particular qualities of stainless steel.

For this reason, the metallurgical vessels which are used are equipped with identification tags, the tags in particular containing special transponders. With the help of these identification tags, the metallurgical vessels which are being used can be unambiguously recognized and identified at the various tracking positions.

The identification tags for the metallurgical vessels are either permanently welded to the container which is to be identified, or are joined to it by a releasable screw connector. The transport of the vessels often damages the identification tags, or rips them off the metallurgical vessel which is to be identified. For this reason, the identification tags which are required for the identification must be repeatedly renewed or replaced.

Because of the harsh conditions which prevail in metallurgical industrial plants, there are not only mechanical stresses on the identification tags but also, because of the arrangement of the identification tags on the hot vessels, there are thermal stresses which result in the failure of the passive transponders which are used. A transponder failure of this sort leads to it no longer being possible to automatically recognize a vessel.

From DE 10 2008 011 288 A1, a brake lining for a disk brake is known, into which several transponders can be incorporated. Depending on the wear state of the brake lining, the transponders fail successively. Depending on which, and possibly also how many, of the transponders react to a read signal from a reading device, it is thus possible to reach conclusions about the wear state of the brake lining.

It is known from US 2011/0 140 970 A1 that a human object can be provided with a plurality of transponders. The plurality of transponders serves to ensure a reliable recognition of the object, even if individual transponders are obscured, i.e. if for example the human object itself or another human object or another item is positioned between one of the transponders and a station which recognizes the transponder.

SUMMARY OF THE INVENTION

The object of the present invention consists is to create possibilities which enable a possible failure of the identification tags, in particular one due to thermal wear, to be recognized in good time. The recognition should be possible, in particular, before automatic identification of the metallurgical vessel concerned, based on the recognition of the transponder, is no longer possible.

In accordance with the invention, a metallurgical vessel of the type cited in the introduction is constructed so that there is embedded in the carrier matrix at least one further passive transponder, so that in total there are at least two passive transponders embedded in the carrier matrix. The passive transponders can be arranged in one plane and/or in different planes on the identification tag. The carrier matrix can consist for example of glass fiber plates, wood etc., in order to limit as much as possible the heat transfer from the metallurgical vessel to the transponders.

The number of passive transponders, as mentioned, is a minimum of two. Their quantity can however also be greater. In particular, the more transponders that are present, the less likely is there to be a simultaneous failure of all the transponders contained in an identification tag. If one transponder from a plurality of transponders fails due to excessive mechanical and/or thermal stress, at least one redundant further transponder is present which is with high probability still functionally competent, and from which the data for recognizing and automatically identifying the metallurgical vessel, to which the identification tag is affixed, can be read out. The risk that, because of a defective transponder, metallurgical vessels cannot be recognized and identified is thus drastically reduced.

However, the failure of one or several of the transponders present in the identification tag can also give an indication that significant wear has occurred, and the replacement of the identification tag should be undertaken before ultimately all the transponders fail.

The inventive identification tag makes possible the recognition of its current wear state on the basis of a recognition of the number of passive transponders which can be activated and, if appropriate, the number of them which can no longer be activated.

A passive transponder (=radio-communication device) draws the energy required for the working through its internal processes inductively from electromagnetic fields provided externally, which are radiated for example through an antenna. Thus, although passive transponders do not have their own energy supply, they can still work over shorter distances. Here, all types of passive transponder, but in particular in the form of RFID transponders as well as SAW transponders (SAW=Surface Acoustic Waves) have proven to be suitable.

It has proven beneficial if the at least two passive transponders are arranged beside each other and spaced apart on one plane in the identification tag. This arrangement is informative, in particular, when there is a one-sided mechanical stress on the identification tag, because in such a case generally only one of the transponders fails.

Preferably at least two planes will be available, wherein at least one passive transponder may be arranged on each plane. This arrangement is especially suitable in the case of frontal mechanical stressing or high thermal stresses on the sides of the vessel.

Preferably at least two planes will be available in addition, wherein on each plane at least two transponders are arranged beside each other and spaced apart. This arrangement covers reliably both the case of a one-sided thermal stress and also the cases of a one-sided or frontal mechanical stress and a one-sided thermal stress.

In one preferred embodiment, the carrier matrix has several layers, wherein the thickness of the layers decreases monotonically as the distance from the outer surface of the metallurgical vessel increases, and arranged between each two layers there is in each case at least one of the passive transponders. This minimizes the thermal wear on the transponders, even though they are arranged sequentially one behind another when looking orthogonally at the surface of the metallurgical vessel.

In accordance with the invention, an operating method of the type cited in the introduction is structured so that
the evaluating unit determines which and/or how many of the transponders have actually been activated, and
as a function of this determination, the evaluating unit assigns a wear state to the totality of the passive transponders of the respective metallurgical vessel.

If it is possible to activate all the passive transponders which are present, then there is either no wear or an unimportant level of wear. The totality of transponders are classified as present and operative in order and is used further. If it is not possible to activate all the passive transponders which are present, then damage is assumed. At least one of the transponders is planned for an early replacement. The more of the available passive transponders which cannot be activated, the higher is the level of damage or wear classified.

The reading station must of course know whether the metallurgical vessel is located within the sensing range of the reading station. It is possible that the evaluating unit receives corresponding data from a higher-level management system or from an operator. Alternatively, it is possible that the reading station detects the presence of the metallurgical vessel within the reading station's sensing range by means of a sensing facility.

In case the number of passive transponders actually activated lies above an upper limit, the evaluating unit categorizes the totality of passive transponders as being in order, and permits continued operation of the metallurgical vessel. Conversely, in the event that the number of passive transponders actually activated lies below a lower limit, the evaluating unit immediately issues to an operating individual, via a display unit, a requirement for the replacement of at least one of the passive transponders. Alternatively or additionally, in this case it communicates the requirement to a higher level management system.

It is possible that the lower limit is the same as the upper limit, that is a purely binary decision is made. Preferably however, the upper limit is greater than the lower limit.

In case the number of passive transponders actually activated lies between the lower limit and the upper limit, the evaluating unit outputs a warning signal to the operating individual via the display unit and/or communicates the warning signal to the higher level management system. In this case, the warning signal may be a different signal from a request for the replacement of at least one of the passive transponders. In this way, it is possible to indicate that orderly operation is indeed still possible, but preferably will not be maintained in good order for much longer. The output or communication, as applicable, is effected, for example, in the form or sense of traffic light signaling, in that a "green signal" is output for an identification tag which continues to be functionally competent, a "yellow signal" for a slightly damaged identification tag and a "red signal" for a seriously damaged identification tag.

Within the evaluating unit and together with the output or communication of the warning signal, a timer will preferably be started which, after the expiry of a predetermined delay time, immediately output to an operating individual via the display unit, and/or communicates to the higher level management system, a request for the replacement of at least one of the passive transponders.

This means it possible to continue operating a slightly damaged identification tag for a defined period of time, namely the delay time of the timer, and upon expiry of this time period, automatically to assign a "red signal" or a "replacement identifier" to the identification tag concerned, in order to trigger replacement of the identification tag.

Preferably, the evaluating unit will in addition receive from the management system a usage and movement plan for the metallurgical vessel. In case the evaluating unit outputs a request to the operating individual via the display unit for replacement of at least one of the passive transponders, the evaluating unit determines by using the usage and movement plan a preferred point in time or time period for the replacement of at least one of the passive transponders and outputs that together with the request, to the operating individual via the display unit. It is thus possible to determine in anticipation an optimal time point or period of time, as appropriate, for the replacement of at least one of the transponders.

In accordance with the invention, the evaluating unit for a reading station of the type mentioned in the introduction is constructed such that it determines which and/or how many of the passive transponders have actually been activated, and as a function of this determination assigns a wear state to the totality of the passive transponders of the metallurgical vessel.

The reading station makes possible a rapid and uncomplicated automatic recognition of the passive transponders which can be activated and those which possibly cannot be activated, and thereby detects the current wear state of an identification tag. This makes possible the timely replacement of the identification tag, and hence continuous fault-free operation of the metallurgical vessel.

Preferably, the evaluating unit will be constructed in such a way that it also carries out the advantageous embodiments of the operating method herein.

The properties, features and advantages of this invention, together with the nature and way in which these are achieved, will be more clearly and plainly comprehensible in conjunction with the following description of the exemplary embodiments, which are explained in more detail in conjunction with the drawings. These show, as schematic representations:

DESCRIPTION OF EMBODIMENTS

Figure 1:
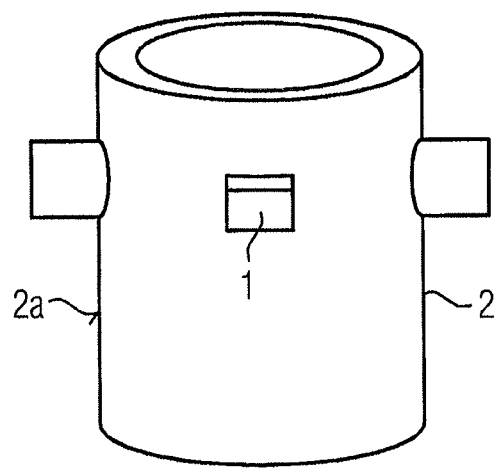
FIG. 1 shows a metallurgical vessel with an identification tag.

FIG. 1 shows a metallurgical vessel 2 with an identification tag 1 which is arranged on the outer surface 2a of the metallurgical vessel 2. The construction of the identification tag 1 will be explained in more detail below.

Figure 2:
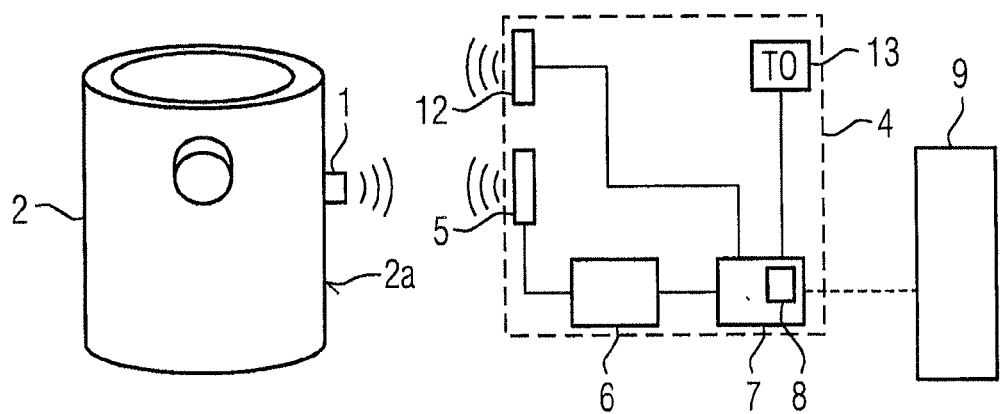
FIG. 2 shows a reading station in communication with the identification tag as shown in FIG. 1.

FIG. 2 schematically shows a reading station 4 in wireless communication with the identification tag 1 as shown in FIG. 1. The same reference numerals identify the same elements. The reading station 4 serves to track the path of the metallurgical vessel 2 in FIG. 1. For this purpose, the reading station 4 reads out, in particular, passive transponders 3, 3a, 3b (see FIGS. 3 to 8) in the identification tag 1. The reading station 4 incorporates an antenna 5, a reading unit 6 and an evaluating unit 7. The reading station 4 is arranged within a metallurgical plant, for example a steel works, at a tracking position. For example, the reading station 4 can be arranged at the electric arc oven, at the open hearth oven, at a slag deposit point, at a vacuum treatment facility or at transport equipment (for example a crane).

If the metallurgical vessel 2 moves into a sensing range of the reading station 4, the reading station 4 becomes aware of this. The sensing range of the reading station 4 is that region within which the transponders 3, 3a, 3b of the identification tag 1 can be detected and read out by an antenna 5 of the reading station 4. Depending on the type of the transponders 3, 3a, 3b, this can lie in the range of a few centimeters up to a few meters.

The reading station 4 is generally arranged in a housing, indicated in FIG. 2 by the dashed line around it. It is possible that the reading station 4 is provided with a thermally protective shield (not shown), which screens off the reading station 4 from the heat radiation from the metallurgical vessel 2 which is being moved past it. The protective shield can, for example, be in the form of a Teflon® PTFE plate. If necessary, the reading station 4 can also have air conditioning, for protecting its electronic units.

The antenna 5 can be alternatively arranged within or outside the housing of the reading station 4. In the latter case, irrespective of whether the reading station 4 does or does not have a thermally protective shield, the antenna 5 can have its own thermally protective shield. The statements above about the construction of the protective shield for the reading station 4 can be applied analogously. Where the antenna 5 is arranged outside the housing of the reading station 4, the electronics of the reading station 4 can be arranged rather more protected on the side away from the main danger region. This is advantageous in particular in regions which are highly thermally stressed. Furthermore, in this case the antenna 5 will preferably consists of metal. The link between the antenna 5 and the remaining components of the reading station 4 is preferably effected via a cable and if appropriate, the cable is arranged in a protective duct or protective tube.

For notification that the metallurgical vessel 2 is located within the sensing range of the reading station 4, the evaluating unit 7 can, for example, accept corresponding data from an operator (not shown). Alternatively, the data can be made available to the evaluating unit 7 by a higher level management system 9. Alternatively, it is possible that the reading station 4 has a sensing facility 12, by means of which the presence of the metallurgical vessel 2 within the sensing range of the reading station 4 is detected. Examples of suitable sensing facilities 12 are ultrasonic, radar or laser sensors. As there is often metal which is liquid and hence hot, or also hot slag, in the metallurgical vessel 2, thermal detection can also be possible in some circumstances.

If a metallurgical vessel 2 is located within the sensing range of the reading station 4, activation of the passive transponders 3, 3a, 3b of the identification tag 1 of the metallurgical vessel 2 will be initiated by the antenna 5 of the reading station 4. The antenna 5 thus emits an appropriate excitation signal. In response, each transponder 3, 3a, 3b sends back an appropriately modulated reply signal, which is received in turn by the antenna 5 and is communicated to the reading unit 6 of the reading station 4. As a result, the reading unit 6 of the reading station 4 reads out the activated passive transponders 3, 3a, 3b. The reading unit 6 communicates the result to the evaluating unit 7.

In an ideal situation, all the transponders 3, 3a, 3b, which are arranged on the metallurgical vessel 2, react to the excitation signal from the antenna 5. However, if one or more of the transponders 3, 3a, 3b is damaged, it does not react to the excitation signal. The evaluating unit 7 therefore determines which and/or how many of the passive transponders 3, 3a, 3b have actually been activated. Depending on what is determined, the evaluating unit 7 assigns to the totality of the passive transponders 3, 3a, 3b (or to the identification tag 1 as a whole, as appropriate) a wear state. It is possible not only to determine the number of transponders 3, 3a, 3b which have actually been activated, but also to distinguish between them, because each transponder 3, 3a, 3b emits its own identification signal, which differs not only from the identification signals from the transponders 3, 3a, 3b of other identification tags 1 but differs also from the identification signals from the transponders 3, 3a, 3b of its own identification tag 1.

For assigning a wear state, the evaluating unit 7 can in particular classify the totality of the passive transponders 3, 3a, 3b (or the identification tag 1 as a whole, as appropriate) as being in order, and permit continued operation of the metallurgical vessel 2, if the number of passive transponders 3, 3a, 3b actually activated lies above an upper limit. This upper limit must not necessarily be a whole number. Conversely, the evaluating unit 7 can classify the totality of the passive transponders 3, 3a, 3b (or the identification tag 1 as a whole, as appropriate) as being worn if the number of passive transponders 3, 3a, 3b actually activated lies below a lower limit. Like the upper limit, this lower limit must not necessarily be a whole number.

If the evaluating unit 7 makes, a classification that a passive transponder is worn, the evaluating unit 7 will output immediately, i.e. with no time delay, a request for replacement of at least one of the passive transponders 3, 3a, 3b, or for the replacement of the identification tag 1 as a whole, as appropriate. It is possible that the output is made via a display unit 8 to an operating individual (not shown). The display unit 8 can be a simple signaling light. It can also be, for example, a computer monitor or the like, via which an appropriate message is output. It is also possible that the display unit 8 is a mobile terminal device, such as a smart phone or a tablet. Alternatively, output of the request can be effected by communication to a higher level management system 9, to which the evaluating unit 7 has a data link. In this case, the request will be further processed there. The data link from the evaluating unit 7 to the management system 9 can be wire-based or wireless, as required. It is even possible that the evaluating unit 7 communicates with the management system 9 (or some other facility) via a larger network, even via the Internet.

The upper limit and the lower limit can be determined as required. For example, if each identification tag 1 on the metallurgical vessels 2 encompasses four transponders 3, 3a, 3b, the upper limit could for example lie at 3.5 or 2.5, the lower limit at 2.5 or 1.5. Of course, depending on the number of transponders 3, 3a, 3b in each identification tag 1. Other numerical values are possible and meaningful for the upper limit and the lower limit.

In general, the upper limit is larger than the lower limit. If the number of passive transponders 3, 3a, 3b actually activated lies between the lower limit and the upper limit, the evaluating unit 7 can then output a warning signal via the display unit 8 to the operating individual. If, for example, the upper limit lies at 3.5 and the lower limit at 1.5, this would be the case for actual activation of two and of three passive transponders 3, 3a, 3b. The warning signal is a different signal from the request for the replacement of at least one of the passive transponders 3, 3a, 3b. Alternatively, or in addition, to an output via the display unit 8, the warning signal can be communicated from the evaluating unit 7 to the higher level management system 9.

Preferably, a timer 13 will be started within the evaluating unit 7 together with the output or communication, as applicable, of the warning signal. This timer 13 expires after a predetermined delay time T0. The expiry of the delay time T0 has the effect that immediately the timer 13 outputs to the operating individual via the display unit 8 a request for a replacement of at least one of the passive transponders 3, 3a, 3b, or communicates the request to the higher level management system 9.

Stored in the management system 9 is a usage and movement plan for the metallurgical vessel 2. Preferably, the evaluating unit 7 will accept from the management system 9 this usage and movement plan for the metallurgical vessel 2. At least when the evaluating unit 7 outputs via the display unit 8 a request for a replacement of at least one of the passive transponders 3, 3a, 3b, the evaluating unit 7 can therefore also at the same time, using the usage and movement plan, determine a preferred time point or time period for the replacement of at least one of the passive transponders 3, 3a, 3b, and output it together with the request to the operating individual via the display unit 8.

Figure 3:
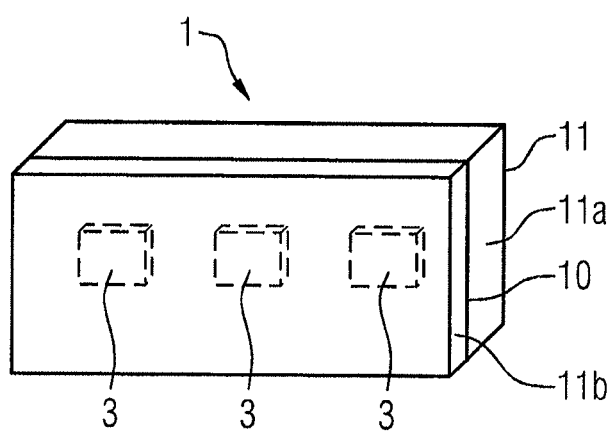
FIG. 3 shows a first identification tag with three passive transponders.
Figure 4:
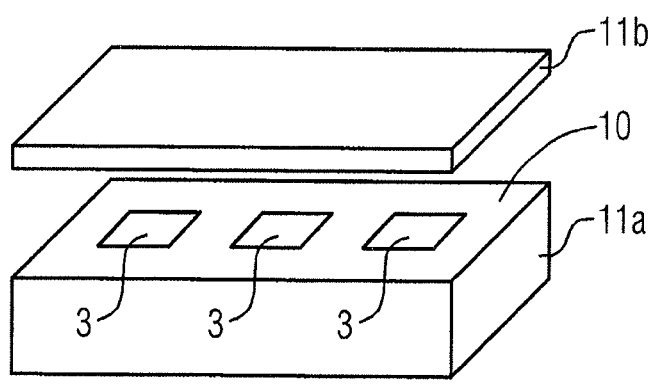
FIG. 4 shows a side view of the first identification tag in FIG. 3, as an exploded representation.

FIGS. 3 and 4 show a first identification tag 1 with a carrier matrix 11, and three passive transponders 3, which are arranged spaced apart and alongside each other embedded on a plane 10 in the carrier matrix 11. The carrier matrix incorporates a first layer 11a and a thinner second layer 11b, on the contact surfaces of which is located the plane 10. In the assembled state of the identification tag 1, the layer 11a is facing towards the surface 2a of the metallurgical vessel 2, the layer 11b away from the surface 2a.

Figure 5:
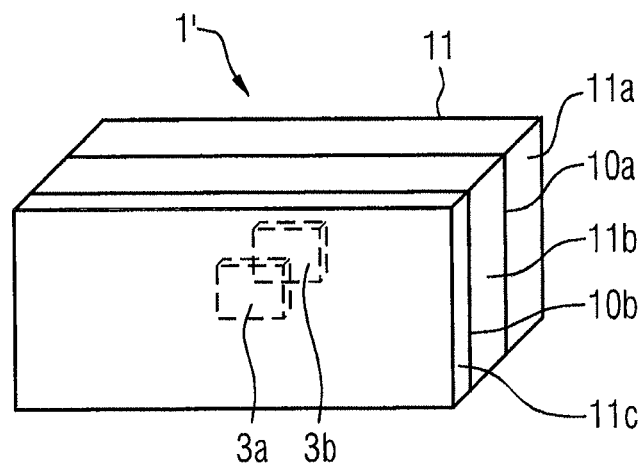
FIG. 5 shows a second identification tag, with two passive transponders.
Figure 6:
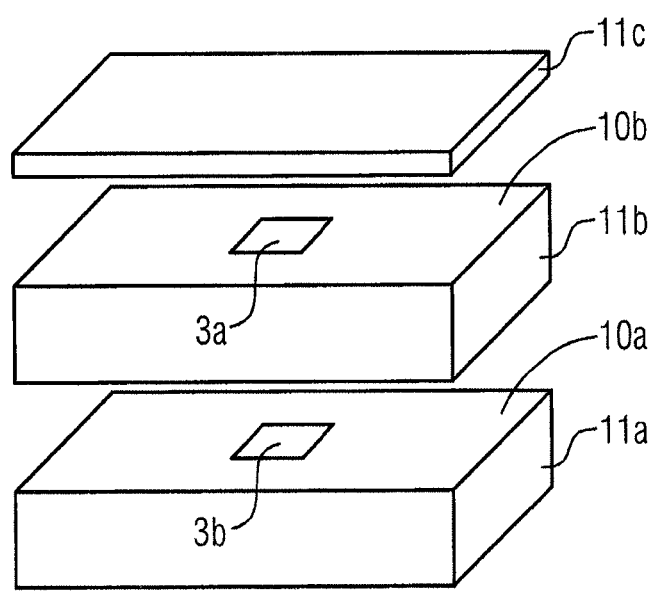
FIG. 6 shows a side view of the second identification tag in FIG. 5 as an exploded representation.

FIGS. 5 and 6 show a second identification tag 1' with a carrier matrix 11 and with two passive transponders 3a, 3b which are arranged embedded on different planes 10a, 10b in the carrier matrix 11. The carrier matrix 11 incorporates a first layer 11a and a second layer 11b and a third layer 11c. The first plane 10a and the transponder 3b are located between the first layer 11a and the second layer 11b, while the second plane 10b and the transponder 3a are located between the second layer 11b and the third layer 11c. In the assembled state of the identification tag 1, the layer 11a faces towards the surface 2a of the metallurgical vessel 2, the layer 11c faces away from the surface 2a. The thickness of the layer 11a is greater than the thickness of the layer 11c. The thickness of the layer 11b is at least as great as the thickness of the layer 11c, and at most as great as the thickness of the layer 11a. In general it lies between these two values.

Figure 7:
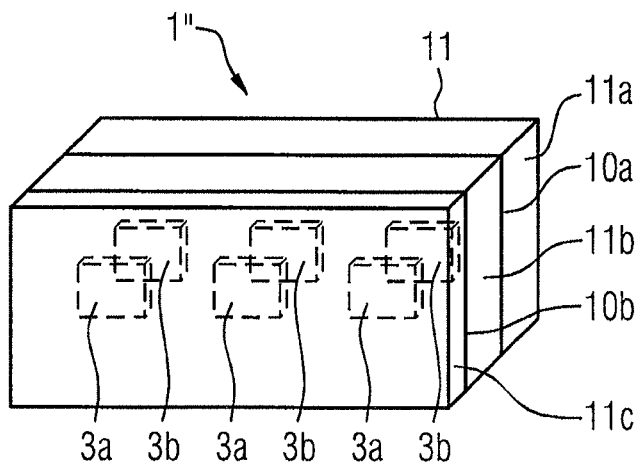
FIG. 7 shows a third identification tag with six passive transponders.
Figure 8:
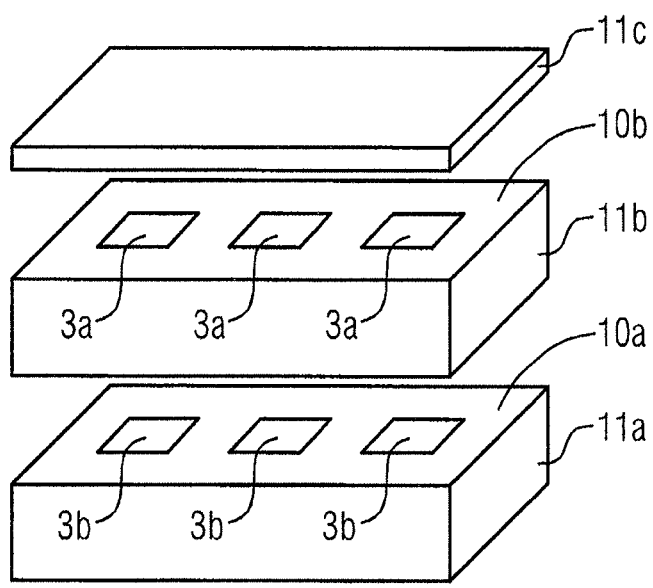
FIG. 8 shows a side view of the third identification tag in FIG. 7 as an exploded representation.

FIGS. 7 and 8 show a third identification tag 1" with a carrier matrix 11 and with six passive transponders 3a, 3b. Three passive transponders 3b are arranged embedded in the carrier matrix 11 alongside each other and spaced apart on a first plane 10a. In addition, three passive transponders 3a are arranged embedded in the carrier matrix 11 alongside each other and spaced apart on a second plane 10b. The carrier matrix 11 incorporates a first layer 11a, a second layer 11b and a thin third layer 11c. The first plane 10a and the transponders 3b are located between the first layer 11a and the second layer 11b, while the second plane 10b and the transponders 3a are located between the second layer 11b and the third layer 11c. In respect of the arrangement of the layers 11a, 11b and 11c relative to the metallurgical vessel 2, and in respect of the thicknesses of the layers 11a, 11b, 11c, the constructions are in an analogous form to FIGS. 5 and 6.

The arrangement of the transponders 3, 3a, 3b, the form of the carrier matrix 11, the number of layers 11, 11a, 11b of the carrier matrix 11 as well as the arrangement of the identification tag 1 on a metallurgical vessel 2 etc. are chosen in the FIGs purely by way of example, and can be changed at will. The critical factor is that the carrier matrix 11 is constructed from a material which is electrically and thermally insulating—for example wood (solid, or in a form using chips bonded with a binder, or the like) or glass fiber or a mixture or combination of materials of this type—and embedded in the carrier matrix 11 are at least two passive transponders 3, 3a, 3b.

Summarized briefly, the present invention thus relates to the following situation:

A metallurgical vessel 2 has an outer surface 2a and an identification tag 1, 1', 1". The identification tag 1, 1', 1" is arranged on the outer surface 2a. It has a carrier matrix 11, which is constructed from a material which is electrically and thermally insulating. Embedded in the carrier matrix are at least two passive transponders 3, 3a, 3b. Arranged within a metallurgical plant is a reading station 4 at a tracking position, for tracking the path of the metallurgical vessel 2. An antenna 5 of the reading station 4 initiates an activation of the passive transponders 3, 3a, 3b if the metallurgical vessel 2 is located within a sensing range of the reading station 4. Thereupon, a reading unit 6 of the reading station 4 reads out the passive transponders 3, 3a, 3b which have been activated, and communicates the result to an evaluating unit 7 of the reading station 4. The evaluating unit 7 determines which and/or how many of the passive transponders 3, 3a, 3b have actually been activated. Depending on this determination, the evaluating unit 7 assigns a wear state to the totality of the passive transponders 3, 3a, 3b of the metallurgical vessel 2.

The present invention has many advantages. In particular, it is possible in a simple way to achieve a reliable operation of the metallurgical plant. Furthermore, the recognition of the metallurgical vessel 2 and the determination of the wear state of the identification tags 1, 1', 1", including the measures which build on this, can without further ado be linked into a network in the sense of the thinking of "Industry 4.0" or "Internet of Things and Services".

Although the invention has been illustrated and described in more detail by the preferred exemplary embodiment, the invention is not restricted by the examples disclosed, and other variations can be derived from it by a person skilled in the art without going outside the scope of protection of the invention.

LIST OF REFERENCE MARKS 1, 1', 1" identification tags
2 metallurgical vessel
2a outer surface
3, 3a, 3b transponders
4 reading station
5 antenna
6 reading unit
7 evaluating unit
8 display unit
9 management system
10, 10a, 10b planes
11 carrier matrix
11a, 11b, 11c layers
12 sensing equipment
13 timer
T0 delay time

The invention claimed is:

1. A metallurgical vessel, comprising:
an exterior of the vessel;
an identification tag at the exterior of the vessel;
the identification tag comprises:
a carrier matrix comprised of an electrically and thermally insulating material and at least two passive transponders embedded in the carrier matrix;
the carrier matrix is comprised of several layers,
each layer is above another layer inward from a side of the metallurgical vessel;
each of the layers has a respective thickness measured inward from the side of the metallurgical vessel;
the thicknesses of the layers decreases with increasing distance from an outer surface at the side of the metallurgical vessel; and
at least one of the passive transponders is arranged between two adjacent ones of the layers;
wherein each passive transponder is configured to output a signal sufficient to identify the metallurgical vessel and to distinguish itself from remaining passive transponders of the metallurgical vessel.

2. The metallurgical vessel as claimed in claim 1, wherein the identification tag is arranged on the outer surface of the vessel.

3. The metallurgical vessel as claimed in claim 1, further comprising at least two sets of the adjacent layers, and a respective passive transponder is performed between each two of the layers of a set of at least two of the adjacent layers.

4. The metallurgical vessel as claimed in claim 1, wherein the exterior of the vessel includes an outer surface thereof and the tag is at the outer surface of the vessel.

* * * * *